United States Patent
Papantoniou

(10) Patent No.: US 9,178,942 B1
(45) Date of Patent: Nov. 3, 2015

(54) SYSTEMS AND METHODS FOR UPDATING NATIVE CONTACT INFORMATION

(71) Applicant: ConnectID Limited, Tonbridge, Kent (GB)

(72) Inventor: Anastasios Papantoniou, London (GB)

(73) Assignee: ConnectID Limited, Tonbridge (GB)

( * ) Notice: Subject to any disclaimer, the term of this patent is extended or adjusted under 35 U.S.C. 154(b) by 0 days.

(21) Appl. No.: 14/516,694

(22) Filed: Oct. 17, 2014

(51) Int. Cl.
*G06F 17/30* (2006.01)
*H04L 29/08* (2006.01)

(52) U.S. Cl.
CPC ...... *H04L 67/1095* (2013.01); *G06F 17/30575* (2013.01)

(58) Field of Classification Search
CPC ................................................. G06F 17/30575
USPC ......... 707/610, 611, 617, 618, 620, 624, 626, 707/634–640, 674, 999.204
See application file for complete search history.

(56) References Cited

U.S. PATENT DOCUMENTS

| | | | |
|---|---|---|---|
| 7,743,100 B2 | 6/2010 | Cheah | |
| 7,996,468 B2 | 8/2011 | Cheah | |
| 8,364,711 B2 | 1/2013 | Wilkins et al. | |
| 2004/0064502 A1* | 4/2004 | Yellepeddy et al. | 709/203 |
| 2006/0293905 A1* | 12/2006 | Ramanathan et al. | 705/1 |
| 2007/0038720 A1 | 2/2007 | Reding et al. | |
| 2007/0250550 A1 | 10/2007 | Berninger | |
| 2008/0229244 A1* | 9/2008 | Markus et al. | 715/811 |
| 2011/0113084 A1 | 5/2011 | Ramnani | |
| 2012/0036261 A1* | 2/2012 | Salazar et al. | 709/225 |

* cited by examiner

*Primary Examiner* — Syling Yen
(74) *Attorney, Agent, or Firm* — Christopher J. McKenna; Foley & Lardner LLP

(57) ABSTRACT

Systems and methods for automatically updating contact information in a native contacts application of a device are provided. A contact synchronization engine executing on one or more processors can store a first plurality of contacts received from a first agent running on a first device, store a second plurality of contacts received from a second agent on a second device, receive a change to one or more contact fields of a contact of a user of the second device, determine that the contact of the user of the second device is in the first export, and transmit, responsive to the determination, the change to the first agent.

26 Claims, 6 Drawing Sheets

US 9,178,942 B1

SYSTEMS AND METHODS FOR UPDATING NATIVE CONTACT INFORMATION

FIELD OF THE DISCLOSURE

This disclosure generally relates to managing contact information on a computing device. In particular, this disclosure relates to automatically updating contact information based on a change transmitted from a device corresponding to a contact.

BACKGROUND

Networked computing devices store contacts in a native contact application. Each contact has one or more contact fields, each having a piece of contact information unique to an individual or entity associated with that contact. A contact field may hold, for example, a phone number, email address, physical address, social network ID, URL, or the like. Occasionally one or more contact fields require updating when the individual or entity moves, changes jobs, or otherwise changes its contact information.

SUMMARY

Described herein are systems and methods for updating native contact information. Illustrative applications for the systems and methods described herein may include, but are not limited to, maintaining up-to-date contact information for contacts in a native contact application of a computing device, such as the Contacts application on an IOS-based smart phone and OSX-based laptop and desktop computers, or the People application on an Android-based smartphone or for hybrid applications that are not native IOS or OSX based. Such contact information can include phone numbers, email addresses, physical and postal addresses, social media usernames, URL's, instant messaging handles, and the like.

At least one aspect is directed to a method for automatically updating a contact stored in a native contact application of a device. The method can include storing, in a database of a server, a first export of a first plurality of contacts received from a first agent executed on a first device. The method can including storing, in the database, a second export of a second plurality of contacts received from a second agent executed on a second device. The method can include receiving, by the server from the second agent, a change to one or more contact fields of a contact of a second user. The method can include determining, by the server, that the contact of the second user is in the first export. The method can include transmitting, by the server, responsive to the determination, the change to the first agent.

At least one aspect is directed to a system for automatically updating a contact stored in a native contact application of a device. The system can include one or more processors and a contact synchronization engine configured to execute on the one or more processors. The system can be configured to store, in a database of a server, a first export of a first plurality of contacts received by the contact synchronization engine from a first agent executed on a first device. The system can be configured to store, in the database, a second export of a second plurality of contacts received by the contact synchronization engine from a second agent executed on a second device. The system can be configured to receive, from the second agent, a change to one or more contact fields of a contact of a second user. The system can be configured to determine that the contact of the second user is in the first export. The system can be configured to transmit, responsive to the determination, the change to the first agent.

At least one aspect is directed to a method for automatically managing updates to a contact stored in a native contact application of a device. The method can include identifying, by a first agent executed on a first device, a plurality of contacts of a first user stored in a native contact application of the first device, each of the plurality of contacts comprising contact information for a different third person. The method can include transmitting, by the first agent via a network to a server, an export of the plurality of contacts. The method can include receiving, by the first agent from the server, a change in one or more contact fields of a contact of the plurality of contacts received by the server from a second agent executed on a second device of a second user. The method can include storing, by the first agent, responsive to a confirmation of the first user, the change in the one or more contact fields to the native contact application.

At least one aspect is directed to a device for automatically updating a contact stored in a native contact application of a device. The system can include one or more processors and an agent configured to execute on the one or more processors. The device can be configured to identify a plurality of contacts of a first user stored in a native contact application of the first device, each of the plurality of contacts comprising contact information for a different third person. The device can be configured to transmit, to a server, an export of the plurality of contacts. The device can be configured to receive, from the server, a change in one or more contact fields of a contact of the plurality of contacts received by the server from a second agent executed on a second device. The device can be configured to store, responsive to a confirmation of the first user, the change in the one or more contact fields to the native contact application.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to, and implementations of, methods, apparatuses, and systems for updating native contact information. The various concepts introduced above and discussed in greater detail below may be implemented in any of numerous ways, as the described concepts are not limited to any particular manner of implementation.

Figure 1A:
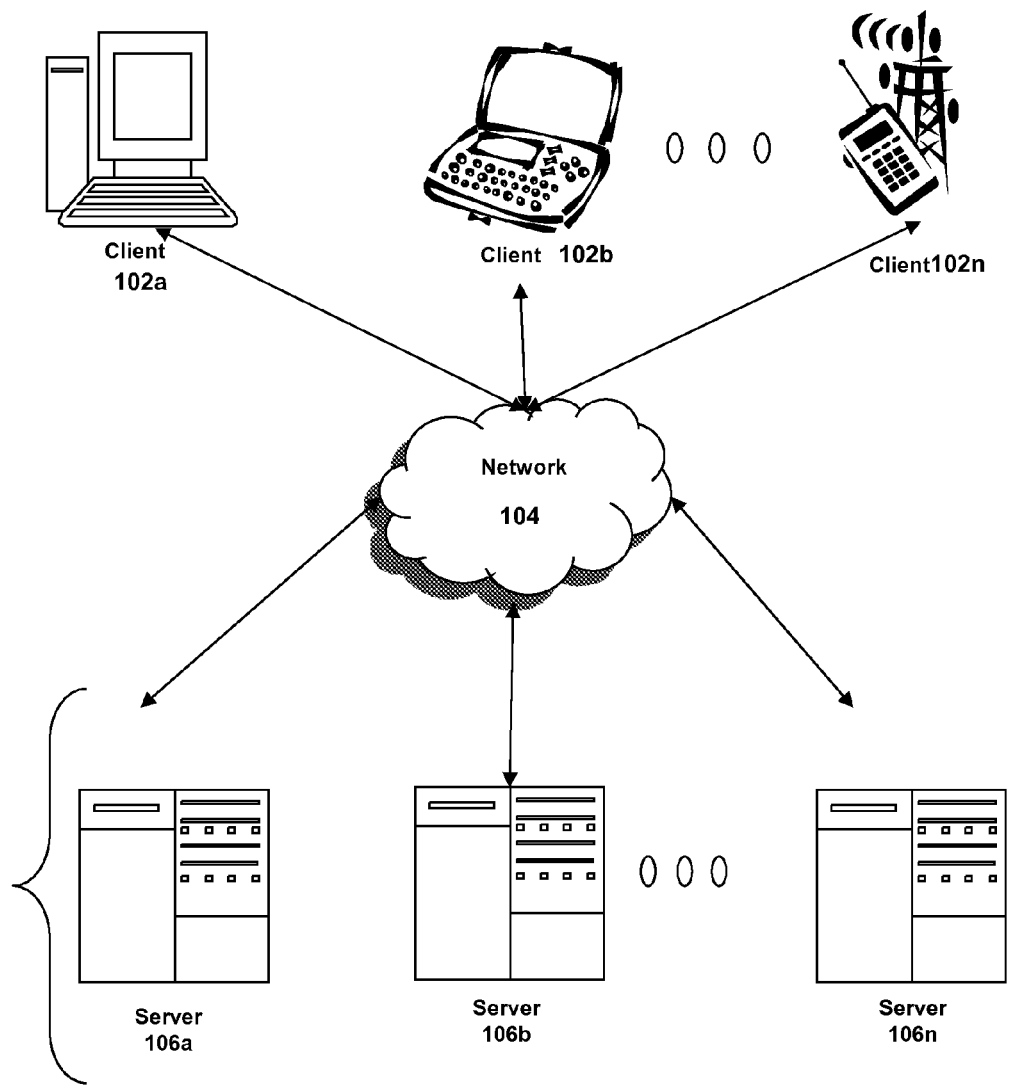
FIG. 1A is a block diagram depicting an example environment for updating native contact information, according to an illustrative implementation.

Prior to discussing the specifics of embodiments of the systems and methods disclosed herein it may be helpful to discuss the network and computing environments in which such embodiments may be deployed. Referring to FIG. 1A, an embodiment of a network environment is depicted. In brief overview, the network environment includes one or more clients 102a-102n (also generally referred to as local machine(s) 102, computing device(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node 106, or remote machine(s) 106) via one or more networks 104. In some implementations, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. The network 104 can be a local-area network (LAN), such as a company intranet, a metropolitan area network (MAN), or a wide area network (WAN), such as the Internet or the World Wide Web. In some implementations, there are multiple networks 104 between the clients 102 and the servers 106. In one of these implementations, a network 104' (not shown) may be a private network and a network 104 may be a public network. In another of these implementations, a network 104 may be a private network and a network 104' a public network. In still another of these implementations, networks 104 and 104' may both be private networks.

The network 104 may be any type and/or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some implementations, the network 104 may comprise a wireless link, such as an infrared channel or satellite band. The topology of the network 104 may be a bus, star, or ring network topology. The network 104 may be of any such network topology as known to those ordinarily skilled in the art capable of supporting the operations described herein. The network may comprise mobile telephone networks utilizing any protocol(s) or standard(s) used to communicate among mobile devices, including AMPS, TDMA, CDMA, GSM, GPRS, UMTS, WiMAX, 3G or 4G. In some implementations, different types of data may be transmitted via different protocols. In other implementations, the same types of data may be transmitted via different protocols.

In some implementations, the system may include multiple, logically-grouped servers 106. In one of these implementations, the logical group of servers may be referred to as a server farm 38 or a machine farm 38. In another of these implementations, the servers 106 may be geographically dispersed. In other implementations, a machine farm 38 may be administered as a single entity. In still other implementations, the machine farm 38 includes a plurality of machine farms 38. The servers 106 within each machine farm 38 can be heterogeneous—one or more of the servers 106 or machines 106 can operate according to one type of operating system platform (e.g., WINDOWS, manufactured by Microsoft Corp. of Redmond, Wash.), while one or more of the other servers 106 can operate on according to another type of operating system platform (e.g., Unix or Linux).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these implementations, hypervisors may be used to emulate virtual hardware, partition physical hardware, virtualize physical hardware, and execute virtual machines that provide access to computing environments. Hypervisors may include those manufactured by VMWare, Inc., of Palo Alto, Calif.; the Xen hypervisor, an open source product whose development is overseen by Citrix Systems, Inc.; the Virtual Server or virtual PC hypervisors provided by Microsoft or others.

In order to manage a machine farm 38, at least one aspect of the performance of servers 106 in the machine farm 38 should be monitored. Typically, the load placed on each server 106 or the status of sessions running on each server 106 is monitored. In some implementations, a centralized service may provide management for machine farm 38. The centralized service may gather and store information about a plurality of servers 106, respond to requests for access to resources hosted by servers 106, and enable the establishment of connections between client machines 102 and servers 106.

Management of the machine farm 38 may be de-centralized. For example, one or more servers 106 may comprise components, subsystems and modules to support one or more management services for the machine farm 38. In one of these implementations, one or more servers 106 provide functionality for management of dynamic data, including techniques for handling failover, data replication, and increasing the robustness of the machine farm 38. Each server 106 may communicate with a persistent store and, in some implementations, with a dynamic store.

Server 106 may be a file server, application server, web server, proxy server, appliance, network appliance, gateway, gateway, gateway server, virtualization server, deployment server, SSL VPN server, or firewall. In one embodiment, the server 106 may be referred to as a remote machine or a node. In another embodiment, a plurality of nodes 290 may be in the path between any two communicating servers.

In one embodiment, the server 106 provides the functionality of a web server. In another embodiment, the server 106a receives requests from the client 102, forwards the requests to a second server 106b and responds to the request by the client 102 with a response to the request from the server 106b. In still another embodiment, the server 106 acquires an enumeration of applications available to the client 102 and address information associated with a server 106' hosting an application identified by the enumeration of applications. In yet another embodiment, the server 106 presents the response to the request to the client 102 using a web interface. In one embodiment, the client 102 communicates directly with the server 106 to access the identified application. In another embodiment, the client 102 receives output data, such as display data, generated by an execution of the identified application on the server 106.

Figure 1B:
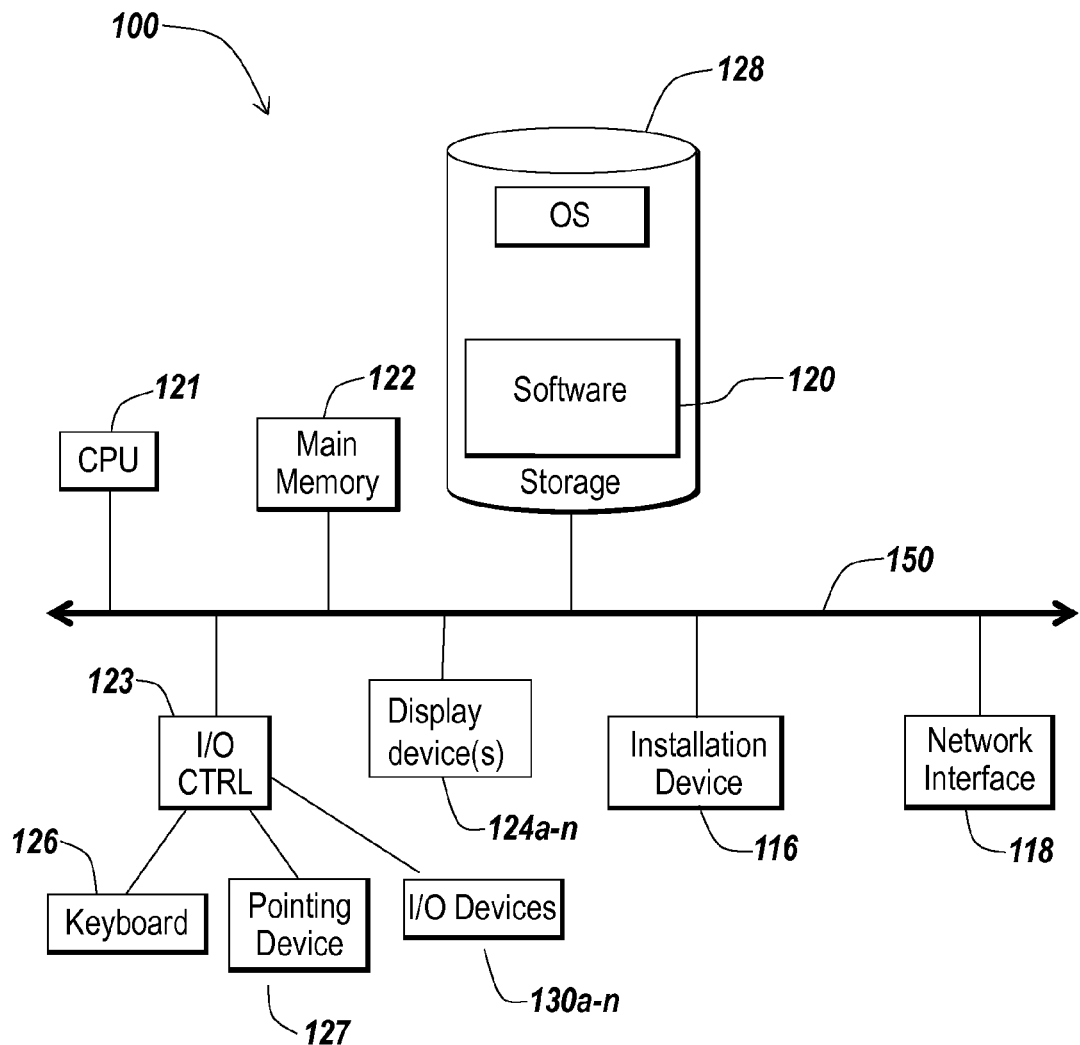
FIG. 1B is a block diagram depicting an example computing device.
Figure 1C:
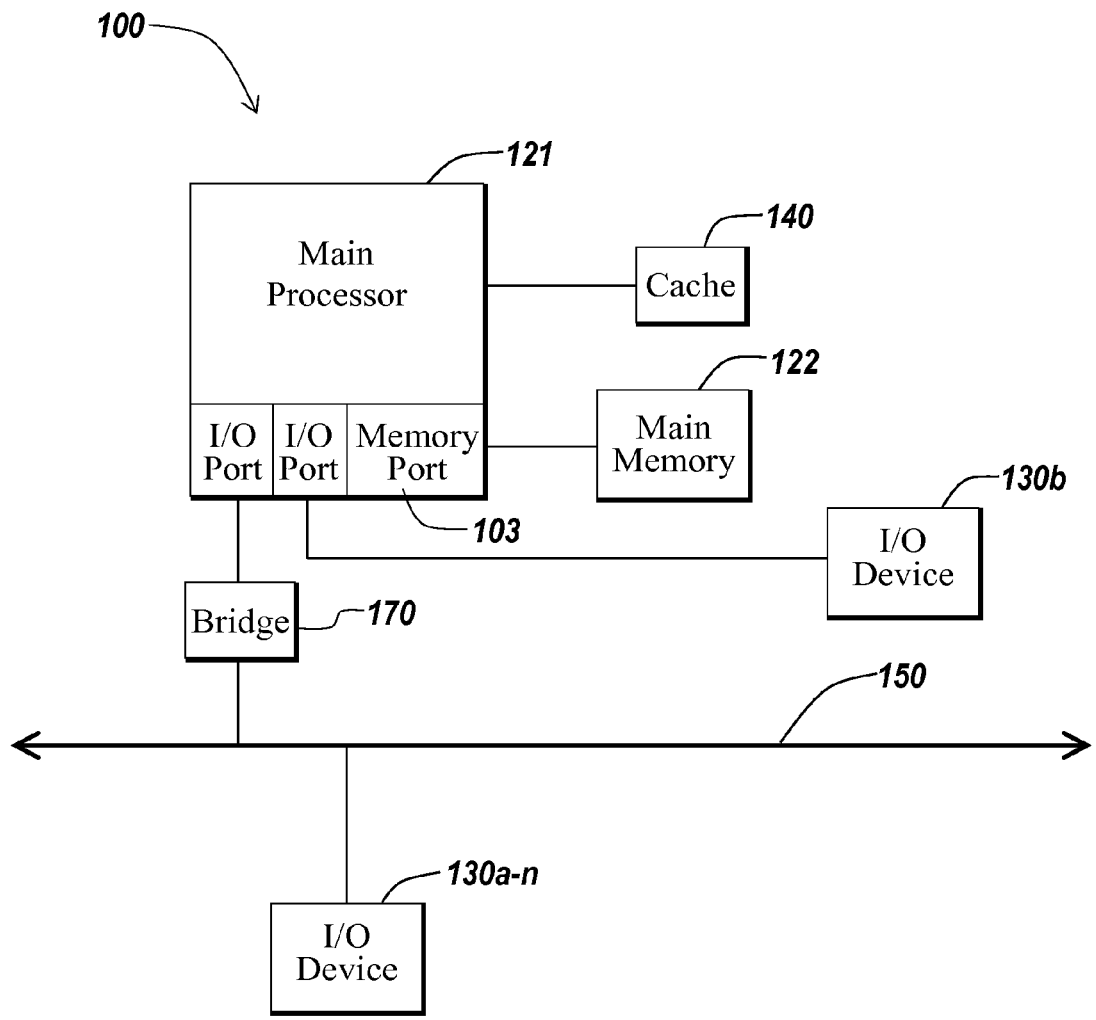
FIG. 1C is a block diagram depicting an example computing device.

The client 102 and server 106 may be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the client 102 or a server 106. As shown in FIGS. 1B and 1C, each computing device 100 includes a central processing unit 121, and a main memory unit 122. As shown in FIG. 1B, a computing device 100 may include a storage device 128, an installation device 116, a network interface 118, an I/O controller 123, display devices 124a-102n, a keyboard 126 and a pointing device 127, such as a mouse. The storage device 128 may include, without limitation, an operating system and/or software. As shown in FIG. 1C, each computing device 100 may also include additional optional elements, such as a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many implementations, the central processing unit 121 is provided by a microprocessor unit, such as: those manufactured by Intel Corporation of Mountain View, Calif.; those manufactured by Motorola Corporation of Schaumburg, Ill.; those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 121, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), Ferroelectric RAM (FRAM), NAND Flash, NOR Flash and Solid State Drives (SSD). The main memory 122 may be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 may be DRDRAM.

FIG. 1C depicts an embodiment in which the main processor 121 communicates directly with cache memory 140 via a secondary bus, sometimes referred to as a backside bus. In other implementations, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1C, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For implementations in which the I/O device is a video display 124, the processor 121 may use an Advanced Graphics Port (AGP) to communicate with the display 124. FIG. 1C depicts an embodiment of a computer 100 in which the main processor 121 may communicate directly with I/O device 130b, for example via HYPERTRANSPORT, RAPIDIO, or INFINIBAND communications technology. FIG. 1C also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices include keyboards, mice, trackpads, trackballs, microphones, dials, touch pads, and drawing tablets. Output devices include video displays, speakers, inkjet printers, laser printers, projectors and dye-sublimation printers. The I/O devices may be controlled by an I/O controller 123 as shown in FIG. 1B. The I/O controller may control one or more I/O devices such as a keyboard 126 and a pointing device 127, e.g., a mouse or optical pen. Furthermore, an I/O device may also provide storage and/or an installation medium 116 for the computing device 100. In still other implementations, the computing device 100 may provide USB connections (not shown) to receive handheld USB storage devices such as the USB Flash Drive line of devices manufactured by Twintech Industry, Inc. of Los Alamitos, Calif.

Referring again to FIG. 1B, the computing device 100 may support any suitable installation device 116, such as a disk drive, a CD-ROM drive, a CD-R/RW drive, a DVD-ROM drive, a flash memory drive, tape drives of various formats, USB device, hard-drive or any other device suitable for installing software and programs. The computing device 100 can further include a storage device, such as one or more hard disk drives or redundant arrays of independent disks, for storing an operating system and other related software, and for storing application software programs such as any program or software 120 for implementing (e.g., configured and/ or designed for) the systems and methods described herein. Optionally, any of the installation devices 116 could also be used as the storage device. Additionally, the operating system and the software can be run from a bootable medium, for example, a bootable CD.

Furthermore, the computing device 100 may include a network interface 118 to interface to the network 104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some implementations, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other implementations, the computing device 100 may include multiple video adapters, with each video adapter connected to one or more of the display devices 124a-124n. In some implementations, any portion of the operating system of the computing device 100 may be configured for using multiple displays 124a-124n. In other implementations, one or more of the display devices 124a-124n may be provided by one or more other computing devices, such as computing devices 100a and 100b connected to the computing device 100, for example, via a network. These implementations may include any type of software designed and constructed to use another computer's display device as a second display device 124a for the computing device 100. One ordinarily skilled in the art will recognize and appreciate the various ways and implementations that a computing device 100 may be configured to have multiple display devices 124a-124n.

In further implementations, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, or a HDMI bus.

A computing device 100 of the sort depicted in FIGS. 1B and 1C typically operates under the control of operating systems, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, manufactured by Google Inc; WINDOWS 7 and 8, manufactured by Microsoft Corporation of Redmond, Wash.; MAC OS, manufactured by Apple Computer of Cupertino, Calif.; WebOS, manufactured by Research In Motion (RIM); OS/2, manufactured by International Business Machines of Armonk, N.Y.; and Linux, a freely-available operating system distributed by Caldera Corp. of Salt Lake City, Utah, or any type and/or form of a Unix operating system, among others.

The computer system 100 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 100 has sufficient processor power and memory capacity to perform the operations described herein. For example, the computer system 100 may comprise a device of the IPAD or IPOD family of devices manufactured by Apple Computer of Cupertino, Calif., a device of the PLAYSTATION family of devices manufactured by the Sony Corporation of Tokyo, Japan, a device of the NINTENDO/Wii family of devices manufactured by Nintendo Co., Ltd., of Kyoto, Japan, or an XBOX device manufactured by the Microsoft Corporation of Redmond, Wash.

In some implementations, the computing device 100 may have different processors, operating systems, and input devices consistent with the device. For example, in one embodiment, the computing device 100 is a smart phone, mobile device, tablet or personal digital assistant. In still other implementations, the computing device 100 is an Android-based mobile device, an iPhone smart phone manufactured by Apple Computer of Cupertino, Calif., or a Blackberry handheld or smart phone, such as the devices manufactured by Research In Motion Limited. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some implementations, the computing device 100 is a digital audio player. In one of these implementations, the computing device 100 is a tablet such as the Apple IPAD, or a digital audio player such as the Apple IPOD lines of devices, manufactured by Apple Computer of Cupertino, Calif. In another of these implementations, the digital audio player may function as both a portable media player and as a mass storage device. In other implementations, the computing device 100 is a digital audio player such as an MP3 players. In yet other implementations, the computing device 100 is a portable media player or digital audio player supporting file formats including, but not limited to, MP3, WAV, M4A/AAC, WMA Protected AAC, RIFF, Audible audiobook, Apple Lossless audio file formats and .mov, .m4v, and .mp4 MPEG-4 (H.264/MPEG-4 AVC) video file formats.

In some implementations, the computing device 100 includes a combination of devices, such as a mobile phone combined with a digital audio player or portable media player. In one of these implementations, the computing device 100 is a smartphone, for example, an iPhone manufactured by Apple Computer, or a Blackberry device, manufactured by Research In Motion Limited. In yet another embodiment, the computing device 100 is a laptop or desktop computer equipped with a web browser and a microphone and speaker system, such as a telephony headset. In these implementations, the computing devices 100 are web-enabled and can receive and initiate phone calls.

In some implementations, the status of one or more machines 102, 106 in the network 104 is monitored, generally as part of network management. In one of these implementations, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these implementations, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

Figure 2:
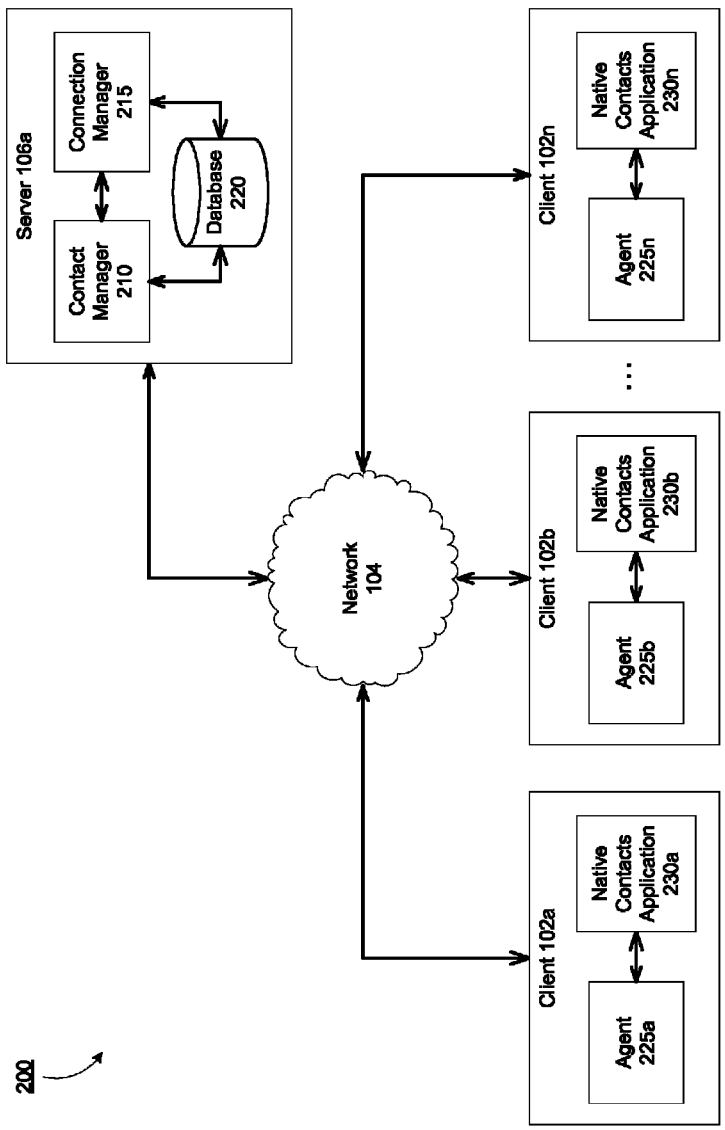
FIG. 2 is a block diagram depicting an example environment for updating native contact information, according to an illustrative implementation.
Figure 3:
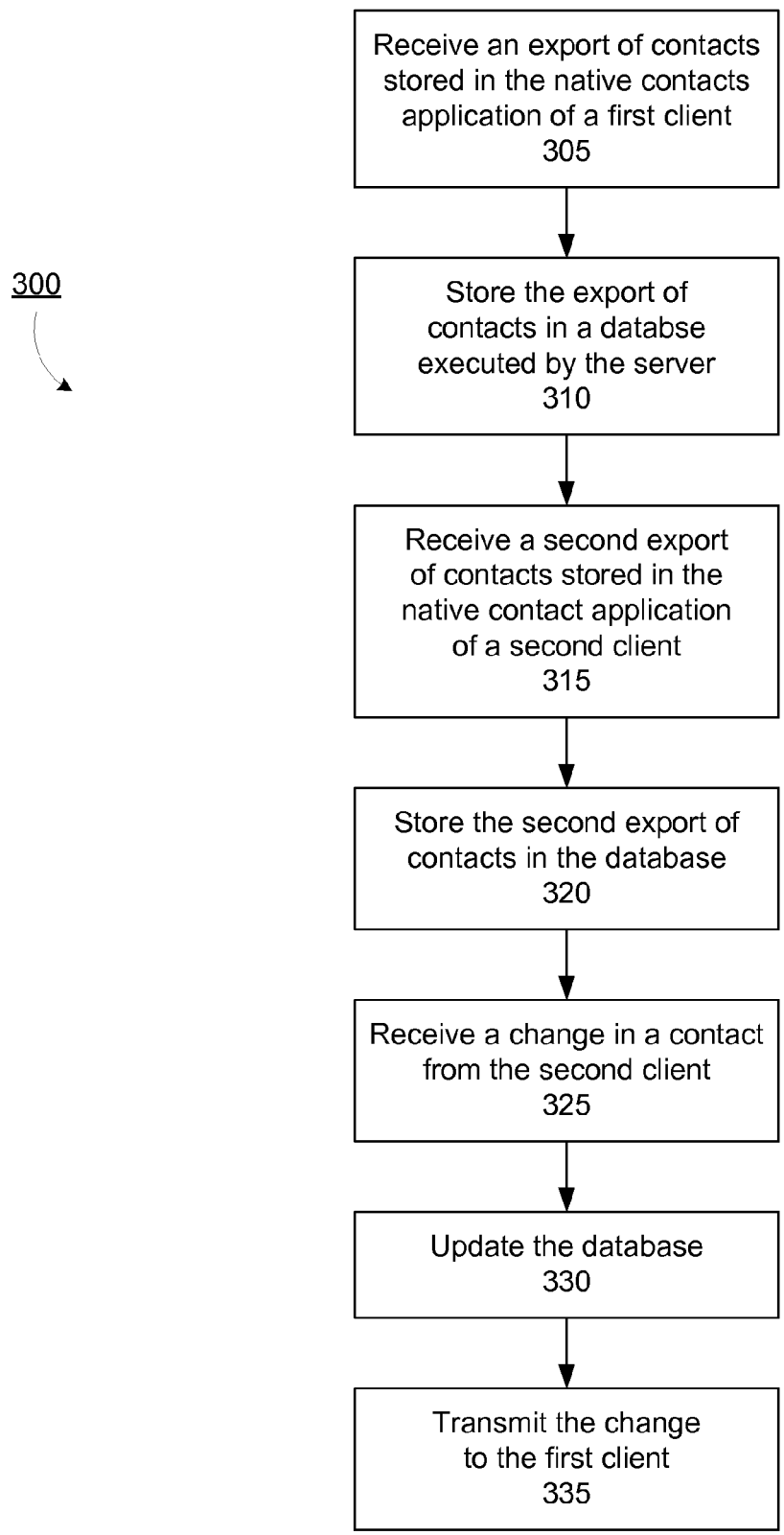
FIG. 3 is a flow diagram depicting an example method of updating native contact information, according to an illustrative implementation.
Figure 4:
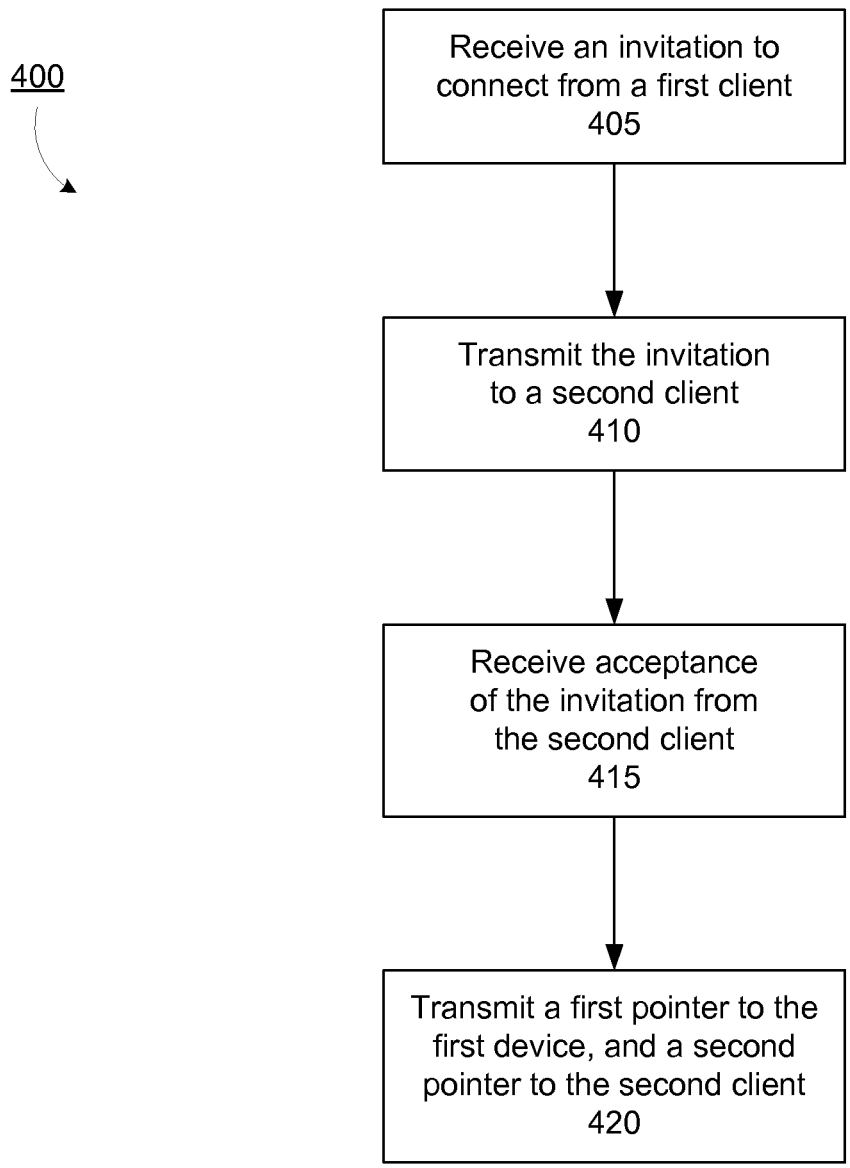
FIG. 4 is a flow diagram depicting an example method of connecting with a contact, according to an illustrative implementation.

Referring now to FIGS. 2-4, systems and methods of the present disclosure related generally to updating contact information in a native contact application of a computing device. For example, a server can store, in a database, an export of a plurality of contacts received from an agent running on a device. The server can store, in the database, a second export of a second plurality of contacts received from a second agent running on a second device. The server can receive, from the second agent, a change to one or more contact fields of a contact of the user of the second device; e.g., one or more of phone number, email address, physical or postal address, social media username, URL, instant messaging handle, or the like. The server can determine that the contact of the user of the second device is in the first export. The server can transmit, responsive to the determination, the change to the first agent. In that manner, contact details of the user of the second device are automatically updated on the first device.

The server can also receive an invitation from the first agent to connect with a second contact of the plurality of contacts. The server can transmit the invitation to a third agent on a third device, the third device associated with the second contact. The server can receive an acceptance of the invitation from the third agent. The server can transmit, to the first agent, a first pointer linking to the second contact in the database. The server can transmit, to the third agent, a second pointer linking to a home contact in the database, the home contact associated with the first device. The server can also receive an update to one or more fields of the second contact and transmit, to the agent, the update. In that manner, contact details are maintained at the server and each user has continual access to the most up-to-date contact details of the other.

FIG. 2 illustrates a block diagrams depicting an embodiment of an environment 200 for updating native contact information. The environment 200 has clients 102a, 102b, ... 102n communicating with a server 106a via a network 104. Each client 102 can have an agent 225 and a native contacts application 230 both executing on the processor 121 from instructions stored in the storage device 128. Each client 102 can connect to the network 104 via the network interface 118. Likewise, the server can connect to the network 104 via its own network interface 118. The server 106a can have a contact manager 210, a connection manager 215, and a database 220 executing on one or more processors 121.

The contact manager 210 of the server 106a may include an application, program, library, script, process, task or any type and form of executable instructions executable on a device, such as the server 106a. The contact manager 210 may be configured or implemented to receive a contact export from a client 102a, store the export in the database 220, receive a change in one or more fields of a contact from a second client 102b, verify that the contact associated with client 102b is present in the export from the client 102a, update the export as it appears in the database 220, and transmit the change to the first client 102a. In some cases, multiple clients 102 can have the contact associated with the second client 102b present in their respective exports. In such cases, the contact manager 210 can transmit the change to each client 102 that has the contact associated with the second client 102b present in its export. The contact manager 210 can also identify when a first client 102a and a second client 102b are possessed or used by the same user, and transmit relevant contact changes to each.

The contact manager 210 can relay an instruction from a first client 102a to a second client 102b to direct future communications to a different communication address. For example, if the second client 102b directs a message to a first email address associated with the first client 102a, the first client 102a can send an instruction to the second client 102b via the contact manager 210 to direct all future communications to a second email address associated with the first client 102a. In this manner, a user of the first client 102a can easily manage how the user receives communications from other users to, for example, maintain a distinction between personal and professional communication addresses. In many embodiments, the user updates this information in the user's profile and/or native contact application and the systems and methods herein update the user's information in other user's contact applications.

The connection manager 215 of the server 106a may include an application, program, library, script, process, task or any type and form of executable instructions executable on a device, such as the server 106a. The connection manager 215 may be configured or implemented to receive an invitation to connect from a first client 102a, transmit the invitation to a second client 102b, receive an acceptance of the invitation from the second client 102b, and transmit to each client 102a and 102b a pointer linking to the other client's contact as it exists in the database 220. For example, the database 220 can have a first export of contacts received from the first client 102a, the export including a contact associated with the second client 102b. Similarly, the database 220 can have a second export of contacts received from the second client 102b, the second export including a contact associated with the first client 102a. When the clients 102a and 102b form a connection, the connection manager 215 can transmit to the first client 102a a pointer to the contact associated with the second client 102b, as that contact exists in the database 220. Similarly, the connection manager 215 can transmit to the second client a pointer to the contact associated with the first client 102a, as that contact exists in the database 220. In that manner, a user accessing the contact of a connection can be directed to the most up-to-date version of that contact as it exists in the database 220, or a locally saved and periodically updated copy of the contacts stored in the database 220.

The database 220 of the server 106a may include an application, program, library, script, process, task or any type and form of executable instructions executable on a device, such as the server 106a. The database 220 can be implemented as an array, table, navigational database, relational database, object-oriented database, NoSQL database, NewSQL database, or any other appropriate data structure. The database 220 can be configured or implemented to maintain storage of exports of contacts from client devices 102 including the handling of updates to contact fields of the contacts. The database 220 can receive contacts, exports, updates, and changes from the contact manager 210. The database 220 can also be configured or implemented to maintain connections between contacts. In such cases, the connection manager 215 can execute the creation of connections between contacts stored in the database 220, and pass the connection information to database 220 for storage.

The agent 225 of the client 102 may include an application, program, library, script, process, task or any type and form of executable instructions executable on a computing device, such as the client 102. The agent may be a non-native application or hybrid application that is not an IOS or OSX native application. The agent may be a native application for the operating systems, such as for IOS or OSX. The agent 225 may be configured or implemented to export contacts from a native contacts application 230, transmit the export to the server 106a, receive updates and changes to contacts from the server 106a, and save those updates and changes to the native contacts application 230. The agent 225 can be configured or implemented to, upon receipt of a communication from a second client 102b directed to a first communication address, transmit an instruction to the server 106a that future communications from a second client 102b should be directed to a second communication address. In this manner, agent 225 can provide an easy mechanism for a user of the first client 102a to maintain a distinction between personal and professional communication addresses. In many embodiments, the agent is configured or implemented to identify the update to the user's information in the user's profile and/or native contact application and to update the user's information in other user's contact applications in accordance with the systems and methods described herein.

The agent 225 can transmit invitations to connect with a second client 102b. The agent 225 can transmit the invitation to connect to the server 106a. If the invitation is accepted by the second client 102b, the first client 102a can receive from the server 106a a pointer linking to the contact associated with the second client 102b in the database 220. In that manner, the agent 225 can be linked to the most up-to-date version of the contact. In some implementations, the agent 225 will maintain a local copy of the contacts it has exported to the server 106a such that contact information can be accessed by the agent 225 even when no connection to the server 106a is available. The agent 225 can maintain local copies of both contacts and connections; that is, the agent 225 can maintain a local copy of a contact regardless of whether a connection has been formed with that contact. The agent 225 can receive any updates or changes that occurred to contacts during the disconnected period when a connection to the server 106a is reestablished. The agent can propagate such updates and changes to the native contacts application 230. In some implementations, the agent 225 can maintain a constant connection with the server 106a. In some implementations the agent 225 can connect with server 106a periodically or as needed.

In some implementations, the agent 225 can be configured or implemented to work as or replace the native contacts application 230. That is, a user of the client 102 can use the agent 225 to look up a contact for the purpose of sending an email, text, phone call, or other type of communication. In some implementations, the agent 225 can receive contacts in the form of VCards such as .vcf or .vcard files, and import them into its own local copy of contacts, or pass them to the native contacts application 230 for storage there. The agent 225 can transmit any new contacts added to client 102a to the server 106a. The new contacts can be transmitted to the server 106a as individual contacts, partial exports, or full exports of every contact stored in either the agent 225 or native contacts application 230 of client 102a.

The native contacts application 230 includes an application, program, library, script, process, task or any type and form of executable instructions executable on a computing device, such as the client 102. Examples of native contacts applications 230 include the Contacts application on IOS-based smart phones and OSX-based laptop and desktop computers, and the People application on an Android-based smartphones. The native contacts application 230 may be configured or implemented to store contacts for retrieval by the user, or for access by other applications or agents running on the client 102, including the agent 225. Generally, the native contacts application 230 is an application or feature included with the client 102 by the manufacturer, or installed by the user. In some implementations, the agent 225 can be used as the native contacts application 230, and become the default for any contact access or management tasks. In other implementations, the agent 225 is designed, configured and/or implemented to work with non-native contacts application.

In an example operation and in some implementations, the server 106a, using the communications manager 210, can receive and store exports of contacts from computing devices, receive a change to a contact from the second device, verify that the contact exists on the first device, and transmit the change to the first device responsive to the determination. The first agent 225a executing on the first client 102a can identify a first plurality of contacts stored in a first native contacts application 230a of the first client 102a. The first agent 225a can generate an export of the plurality of contacts, and transmit them to the server 106a via the network 104. The server can receive the export of the plurality of contacts, and store it in the database 220. A second agent 225b executing on a second client 102b can identify a second plurality of contacts stored in a second native contacts application 230 of the second client 102b. The second agent 225b can generate a second export of the second plurality of contacts, and transmit them to the server 106a via the network 104. The server can receive the second export of the plurality of contacts, and store it in the database 220. The second agent 225b running on the second client 102b can identify a change to one or more contact fields of a contact of a user of the second client 102b. The one or more contact fields can include contact information such as phone numbers, email addresses, physical and postal addresses, social media usernames, URL's, instant messaging handles, and the like. The second agent 225b can transmit the change to the server 106a via the network 104. The server 106a can receive, from the second agent 225b, the change to one or more contact fields of a contact of the user of the second client 102b. The contact manager 210 can receive the change and update the database 220 accordingly. The contact manager 210 can determine that the contact of the user of the second client 102b is present in the export stored in the database 220. Responsive to that determination, the contact manager 210 of server 106a can transmit the change to the first client 102a via the network 104. The first client 102a can receive the change. The first agent 225a executing on the first client 102a can receive the change, and update the contact of the user of the first client 102a as it exists in the first native contacts application 230a of the first client 102a. The first agent 225a can update the contact automatically, or can prompt a user of the first client 102a to approve the update.

In some implementations, the server 106a may determine that the contact of the user of the second client 102b is present in each of a plurality of exports—each received from one of a plurality of clients 102 and stored in database 220—and transmit the change to each of the plurality of clients 102 associated with an export having the contact of the user of the second client 102b.

In some implementations, the server 106a can receive a change to one or more contact fields of the contact of the user of the second client 102b from a third agent 225c executed on a third client 102c, and transmit the change to the first agent 225a. That is, the change in the contact field has been made by someone other than the person the contact information is for. In this case, the server 106a can either take no action when the third agent 225c transmits the change, or transmit a notification to the second agent 225b that a change to the user of the second clients 102b's contact information has been manually changed. In the latter case, the second agent 225b can prompt the user of the second client 102b to verify the change. If the user of the second client 102b verifies the change, the server 106a can then broadcast the update to the first agent 225a, and any additional agents 225 who have included the contact of the user of the second client 102b in their respective contact export. This verification prevents updating contacts with erroneous contact information due to reasons either accidental, nefarious, or humorous.

In many embodiments, the agent(s) and/or server are configured and/or implemented to prevent unauthorized changes to a user's contact information, such as to prevent one user from changing another user's contact information and/or field of a contact record or profile. The agent and/or server may ignore, drop or return an error message to the agent and/or user device from which such unauthorized activity may originate from. The agent and/or server may send notification to the user, such as via the agent of the user, that someone else is attempting to change his or her contact information. In some embodiments, the agent(s) and/or server are configured and/or implemented to allow a first user to change a second user's contact information and/or field of a contact record or profile responsive only to second user's approval or authorization of that first user. In some embodiments, the agent(s) and/or server are configured and/or implemented only to allow a change of a second user's contact information by a first user upon approval by the second user of the change. In some embodiments, the systems and methods described herein are configured to allow or enable crowd-sourcing based changes to a user's contact information and the user is able to control, approve or authorize such changes.

In many embodiments, the agent(s) and/or server are configured and/or implemented to allow a user to see or view, via a user interface or report, what other users and/or user devices has his or her contact information. In many embodiments, the agent(s) and/or server are configured and/or implemented to allow a user to control which user's receive updates when and for which fields. In many embodiments, the agent(s) and/or server are configured and/or implemented to allow a user to prevent updates going to one or more other users, even if those user's already have his or her contact information. For example, in some embodiments of after a user making a change to his or her contact information, the user is able to configure or edit to whom these updates will and/or will not go to. In some embodiments, the agent(s) and/or server are configured and/or implemented to allow a user to control which user's receive which contact record or profiles among a plurality of different contract records or profiles of the user (such as one record/profile for personal, one record/profile for professional, etc.).

In some implementations, a third agent 225c executed on a third client 102c transmits, to the server 106a, a change to a first contact field of a contact of a user of the second client 102b, and a fourth agent 225d executed on a fourth client 102d transmits, to the server 106a, a change to a second contact field of the user of the second client 102b. The server 106a can determine that the contact of the user of the second client 102b is in the first export of contacts received from the first agent 225a. The server 106a can transmit, responsive to that determination, the change in the first contact field and the change in the second contact field to the first agent 225a. As above, the second agent 225b is given the opportunity to approve a change to its contact information. If the change is authorized by the user of the second client 102b, the server 106a can then broadcast both changes to the first agent 225a, and any additional agents 225 who have included the second contact in their respective contact export.

In some implementations, the user of the first client 102a may receive a communication from a third agent 225c addressed to a first communication address. Perhaps, for example, this address is disfavored, or the address is a business address while the nature of the communication is personal in nature. The user of the first client 102a can transmit via the first agent 225a an instruction to the server 106a that subsequent communications from the third agent 225c are to be directed to a second communication address. The server 106a can then transmit the instruction to the third agent 225c. The third agent can then accept the second communication address as a default, generate a notification to the user of the third client 102c if he or she attempts to address future communications to the first communication address, or delete the first communication address altogether from the third native contacts application 230c. In this manner, the first agent 225a can present the user of the first client 102a with a one-step mechanism for controlling its contact channels.

In some implementations, the server 106a can identify a third agent 225c on a third client 102c. The third agent 225c can transmit a third export of a third plurality of contacts to the server 106a via the network 104. The server 106a can identify a fourth agent 225c on a fourth client 102d, the third client 102c and the fourth client 102d belonging to the same user. That is, the server 106a can identify two devices 102, each executing an agent 225, and both possessed or operated by the same user. Each client 102 may have the same contacts stored in its native contacts application 230. The contacts stored in each native contacts application 230 may be synchronized either by direct connection between the two client 102, by the server 106a, or by a third-party server. In other cases, the respective native contacts application 230 of the third client 102c may have contacts not present on the fourth client 102d, or vice versa. In either case, the server 106a can determine that the contact of the user of the second client 102b is in the third export and, responsive to that determination, transmit the change to both the third agent 225c and the fourth agent 225d.

In some embodiments, the systems and methods described herein work without connecting users via any type and form of social networking tool, contact management tool and the like. As such, in many cases, the systems and methods described herein updates contact information between users who are not directly connected and/or are connected only via second degree or greater via other users. In other implementations, the server 106a can receive, via network 104, an invitation from the first agent 225a to connect with a second contact of the plurality of contacts. The server 106a can transmit the invitation to a third agent 225c on a third client 102c, the third client 102c associated with the second contact. The third agent 225c can present the invitation to a user of the third client 102c. If the user of the third client 102c accepts the invitation, the third agent 225c can transmit the acceptance back to the server 106a. The server 106a can then transmit, to the first agent 225a, a first pointer linking to the second contact in the database 220. The server 106a can also transmit, to the second agent 225, a second pointer linking to a home contact in the database 220, the home contact associated with the first client 102a. In this manner, a user accessing a contact on his or her device will see the most up-to-date version of the contact as it exists on the database 220, regardless of whether the contact has been updated, either automatically or manually, in the local native contacts application 230. In some implementations, the server 106a can receive an update to one or more fields of the second contact, and transmit the update to the first agent 225a. In this manner, changes to contacts received by the server 106a are still propagated to agents 225 linked by pointers. The change to a contact can be incorporated into the native contacts application 230, either automatically or subject to acceptance by the user of the client 102.

FIG. 3 is a flow diagram depicting an example method 300 of updating native contact information, according to an illustrative implementation. The method 300 can receive an export of contacts stored in a first native contact application 230a executing on a first client 102a (Step 305). The method 300 can store the export of contacts in a database 220 executed by the server 106a (Step 310). The method 300 can receive a second export of contacts stored in a second native contacts application 230b executing on a second client 102b (Step 315). The method 300 can store the second export of contacts in the database 220 (Step 320). The method 300 can receive a change in a contact from the second client 102b (Step 325). The method 300 can update the database 220 (Step 330). And the method 300 can transmit the change to the first client 102a (Step 335).

The method 300 can receive, by the server 106a, an export of contacts stored in the first native contacts application 230a executing on the first client 102a (Step 305). The first agent 225a executing on the first client 102a can access the first native contacts application 230a, and generate an export of the plurality of contacts stored in the first native contacts application 230a. The first client 102a can transmit the export to the server 106a via network 104. The method 300 can store the export in the database 220 executed on the server 106a (Step 310).

The method 300 can receive, by the server 106a, a second export of contacts stored in a second native contacts application 230b executing on the second client 102b (Step 315). The second agent 225b executing on the second client 102a can access the second native contacts application 230b, and generate a second export of the second plurality of contacts stored in the second native contacts application 230b. The second client 102b can transmit the second export to the server 106a via network 104. The method 300 can store the second export in the database 220 executed by the server 106a (Step 320).

The method 300 can receive, by the server 106a, a change in a contact from the second client 102b (Step 325). The second client 102b can have a home contact associated with it. In some cases, the home contact can be associated with a user of the second client 102b. Occasionally, the user of the second client 102b may change one or more contact fields of his or her contact information; for example, a telephone number or email address. When one or more contacts fields of the home contact of the user of the second client 102b have been changed or updated, the second agent 225b can detect the change and transmit it to server 106a via network 104. The method can receive, by the server 106a, the change and update the contact as it appears in the database 220 (Step 330). The method 300 can transmit, by the server 106a via the network 104, the change to the first client 102a (Step 335). The first agent 225a can receive the change and save the change to the contact in the first native contacts application 230a. The first agent 225a can save the change either automatically, or subject to the approval of the user of the first client 102a.

FIG. 4 is a flow diagram depicting an embodiment of a method 400 of connecting with a contact. The method 400 can receive an invitation to connect from the first client 102a (Step 405). The method 400 can transmit the invitation to a third client 102c (Step 410). The method 400 can receive an acceptance from the third client 102c (Step 415). The method 400 can transmit a pointer to the first client 102a, and transmit a pointer to the third client 102c (Step 420).

The method 400 can receive an invitation to connect from the first client 102a (Step 405). The first user of the first device can indicate to the first agent 225a that he or she wishes to form a connection a contact of the plurality of contacts present in the first native contacts application 230a. The contact can correspond to the third client 102c or a user of the third client 102c. The contact can have already been included in the export of the first plurality of contacts, or can be exported individually after the first user has indicated a wish to form a connection. The first agent 225a can transmit the invitation to the server 106a via the network 104. The server 106a receives the invitation from the first agent 225a.

The method 400 can transmit the invitation to the third client 102c (Step 410). The server 106a can transmit the invitation to the third client 102c via network 104. The third agent 225c executing on the third client 102c receives the invitation, and prompts the user of the third client 102c to either accept or decline the invitation. If the user of the third client 102c accepts the invitation, the third agent 225c can transmit the acceptance via the network 104 to the server 106a. The method 400 can receive an acceptance from the third client 102c (Step 415).

The method 400 can transmit a pointer to the first client 102a, and transmit a pointer to the first device 102b (Step 420). The server 106a, having previously received the first export from the first client 102a, and the third export from the third client 102c, now has the respective contact for each stored in the database 220. The server 106a can transmit to the first client 102a a first pointer to the contact corresponding to the third client 102c that is stored in the database 220. The server 106a can transmit, to the third client 102c, a second pointer to the contact corresponding to the first client 102a that is stored in database 220. The first agent 225a and the third agent 225c now form a connection. In this manner, the first user of the first client 102a can access the contact of the user of the third client 102c via the first pointer linking to the contact of the user of the third client 102c as stored in the database 220. The user of the third client 102c is similarly connected to the user of the first client 102a. If the user of the device 102c changes his or her contact information, the third agent 225c can, either automatically or subject to the approval of the user of the device 102c, transmit the change to the server 106a. The server 106a can receive the change and save it to database 220. If the user of the first client 102a then looks up the contact to the other user using the first agent 225a, the first agent 225a, can return the most up-to-date contact information by virtue of the first pointer linking to the contact of the user of the third client 102c as stored in the database 220. The first agent 225a, upon receiving notification of a change in one or more contact fields of the contact, can update the contact in the native contacts application 230a either automatically or subject to the approval of the user of the first client 102a. If the user of the first client 102a has chosen to use the first agent 225a as his default contacts application, however, updating the native contacts application 230a with the change is not necessary.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations. For example, although the systems and methods described herein may be described generally with an agent and native contact application, these systems and methods may be implemented by an application, such as a non-native application or the native application itself. In one implementation, the native contact app may include any of the implementations of the agent described herein. In another implementation, the agent may provide the functionality of a contacts application (native or non-native) and update the agent's contact database instead of another application, such as the native contact application.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "an alternate implementation," "various implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method for automatically updating a contact stored in a native contact application of a device, the method comprising:
    storing, in a database of the server, a first export of a first plurality of contacts received from a first agent executed on a first device, the first agent receiving the first plurality of contacts from a first native contact application executed on the first device;
    storing, in the database, a second export of a second plurality of contacts received from a second agent executed on a second device, the second agent receiving the second plurality of contacts from a second native contact application executed on the second device;
    receiving, by the server from the second agent, a change to one or more contact fields of a contact of a user of the second device, the second agent receiving the change from the second native contact application;
    determining, by the server, that the contact of the user of the second device is in the first export, and responsive to the change to one or more contact fields of the contact of the user, the server receives from the user of the second device approval to broadcast the changes of the contact of the user; and
    transmitting, by the server, responsive to the determination, the change to the first agent, the first agent transmitting the change to the first native contact application.

2. The method of claim 1, further comprising:
    determining, by the server, that the contact of the user of the second device is in each of a plurality of exports received from a plurality of agents; and
    transmitting, by the server, the change to each of the plurality of agents.

3. The method of claim 1, comprising:
    storing, in the database, a third export of a third plurality of contacts received, from a third agent executed on a third device, the third agent receiving the third plurality of contacts from a third native contact application executed on the third device;
    determining, by the server, that the contact of the user of the second device is in the third export, wherein the server received from the user of the second device a denial of approval to broadcast the changes of the contact of the user; and withholding, by the server, the change from the first agent.

4. The method of claim 1, comprising:

determining, by the server, that the one or more contact fields of the user of the second device is absent from the first export; and withholding, by the server from the first agent, responsive to the determination, the change in the one or more contact fields of the user of the second device.

5. The method of claim 1, comprising:

receiving, by the server from the first agent, an instruction to a third agent that subsequent communications directed to a first communication address are to be directed to a second communication address different from the first communication address; and transmitting, from the server to the third agent, the instruction.

6. The method of claim 1, comprising:

identifying, by the server, a third agent on a third device;

receiving, by the server, a third export of a third plurality of contacts received from the third agent;

identifying, by the server, a fourth agent on a fourth device, the third device and the fourth device belonging to the same user;

determining, by the server, that the contact of the user of the second device is in the third export; and transmitting, by the server, responsive to the determination, the change to the third agent and the fourth agent.

7. The method of claim 1, comprising:

receiving, at the server, an invitation from the first agent to connect with a second contact of the plurality of contacts;

transmitting, from the server, the invitation to a third agent on a third device, the third device associated with the second contact;

receiving, at the server, an acceptance of the invitation from the third agent;

transmitting, from the server to the first agent, a first pointer linking to the second contact in the database; and transmitting, from the server to the third agent, a second pointer linking to a home contact in the database, the home contact associated with the first device.

8. The method of claim 7, comprising:

receiving, at the server, an update to one or more fields of the second contact; and transmitting, from the server to the first agent, the update.

9. A system comprising:

one or more processors; and a contact synchronization engine configured to execute on the one or more processors and to:

store, in a database of a server, a first export of a first plurality of contacts received by the contact synchronization engine from a first agent executed on a first device, the first agent receiving the first plurality of contacts from a first native contact application executed on the first device;

store, in the database, a second export of a second plurality of contacts received by the contact synchronization engine from a second agent executed on a second device, the second agent receiving the second plurality of contacts from a second native contact application executed on the second device;

receive, from the second agent, a change to one or more contact fields of a contact of a user of the second device, the second agent receiving the change from the second native contact application;

determine that the contact of the user of the second device is in the first export, and responsive to the change to one or more contact fields of the contact of the user the server receives from the user of the second device approval to broadcast the changes of the contact of the user; and transmit, responsive to the determination, the change to the first agent, the first agent transmitting the change to the first native contact application.

10. The system of claim 9, the contact synchronization engine further configured to:

determine that the contact is in each of a plurality of exports received from a plurality of agents; and transmit the change to each of the plurality of agents.

11. The system of claim 9, the contact synchronization engine further configured to:

store, in the database, a third export of a third plurality of contacts received, from a third agent executed on a third device, the third agent receiving the third plurality of contacts from a third native contact application executed on the third device;

determine that the contact of the user of the second device is in the third export, wherein the server received from the user of the second device a denial of approval to broadcast the changes of the contact of the user; and withhold the change from the first agent.

12. The system of claim 9, the contact synchronization engine further configured to:

determine that the one or more contact fields of the user of the second device is absent from the first export; and withhold, from the first agent, responsive to the determination, the change in the one or more contact fields of the user of the second device.

13. The system of claim 9, the contact synchronization engine further configured to:

receive, from the first agent, an instruction to a third agent that subsequent communications directed to a first communication address are to be directed to a second communication address different from the first communication address; and transmit, to the third agent, the instruction.

14. The system of claim 9, the contact synchronization engine further configured to:

identify a third agent on a third device;

receiving a third export of a third plurality of contacts received from the third agent;

identify a fourth agent on a fourth device, the third device and the fourth device belonging to the same user;

determine that the contact of the user of the second device is in the third export; and transmit, responsive to the determination, the change to the third agent and the fourth agent.

15. The system of claim 9, the contact synchronization engine further configured to:

receive an invitation from the first agent to connect with a second contact of the plurality of contacts;

transmit the invitation to a third agent on a third device, the third device associated with the second contact;

receive an acceptance of the invitation from the third agent;

transmit, to the first agent, a first pointer linking to the second contact in the database; and transmit, to the third agent, a second pointer linking to a home contact in the database, the home contact associated with the first device.

16. The system of claim 15, the contact synchronization engine further configured to:
  receive an update to one or more fields of the second contact; and
  transmit the update to the first agent.

17. A method for automatically managing updates to a contact stored in a native contact application of a device, the method comprising:
  identifying, by a first agent executed on a first device, a plurality of contacts stored in a native contact application of the first device, each of the plurality of contacts comprising contact information for a different third person;
  transmitting, by the first agent via a network to a server, an export of the plurality of contacts;
  receiving, by the first agent from the server, a change in one or more contact fields of a contact of the plurality of contacts, the server receiving the change from a second agent executed on a second device, the contact being of the user of the second device, and responsive to the change to one or more contact fields of the contact of the user the server receives from the user of the second device approval to broadcast the changes of the contact of the user; and
  storing, by the first agent, responsive to a confirmation of a user of the first device, the change in the one or more contact fields to the native contact application.

18. The method of claim 17, further comprising:
  transmitting, by the agent to the server, in response to a communication from a user of a third device directed to a first communication address of the contact of the user of the first device, an instruction to direct subsequent communications from the user of the third device to a second communication address different from the first communication address.

19. The method of claim 17, further comprising:
  transmitting, by the first agent to the server, an invitation to connect via the server with a contact of a user of a third device, the contact of the user of the third device present in the plurality of contacts;
  receiving, by the agent via the server, an acceptance of the invitation from a third agent on the third device; and
  receiving, by the first agent, a pointer from the server, the pointer linking to the contact of the user of the third device stored in a database of the server.

20. The method of claim 19, further comprising:
  receiving, by the first agent, an update to one or more fields of the contact of the user of the third device; and
  updating, by the first agent, the one or more fields of the contact of the user of the third device in an instance of the contact of the user of the third device stored in the native contact application of the first device.

21. The method of claim 17, further comprising:
  identifying, by the first agent, a second change in a contact field of a contact of the user of the first device; and
  transmitting, by the first agent, the second change to the server to distribute to a plurality of agents executed on a plurality of devices having the contact of the user of the first device stored in a respective native contact application.

22. A device comprising:
  one or more processors; and
  an agent configured to execute on the one or more processors and to:
    identify a plurality of contacts of a user of the device stored in a native contact application of the device, each of the plurality of contacts comprising contact information for a different third person;
    transmit, to a server, an export of the plurality of contacts;
    receive, from the server, a change in one or more contact fields of a contact of the plurality of contacts, the server receiving the change from a second agent executed on a second device, the contact being of the user of the second device, wherein the server received from the user of the second device approval to broadcast the changes of the contact of the user; and
    store, responsive to a confirmation of the user of the device, the change in the one or more contact fields to the native contact application.

23. The communication device of claim 22, the agent further configured to:
  transmit, by the agent to the server, in response to a communication from a user of a third device directed to a first communication address of the contact of the user of the device, an instruction to direct subsequent communications from the user of the third device to a second communication address different from the first communication address.

24. The communication device of claim 22, the agent further configured to:
  transmit, by the agent to the server, an invitation to connect via the server with a contact of a user of a third device, the contact of the user of the third device present in the plurality of contacts;
  receive, by the agent via the server, an acceptance of the invitation from a third agent on the third device; and
  receive, by the agent, a pointer from the server, the pointer linking to the contact of the user of the third device stored in a database of the server.

25. The communication device of claim 24, the agent further configured to:
  receive, by the agent, an update to one or more fields of the contact of the user of the third device; and
  update, by the agent, the one or more fields of the contact of the user of the third device in an instance of the contact of the user of the third device stored in the native contact application of the device.

26. The communication device of claim 22, the agent further configured to:
  identify, by the first agent, a second change in a contact field of a contact of the first user of the first device; and
  transmit, by the first agent, the second change to the server to distribute to a plurality of agents executed on a plurality of devices having the contact of the user of the device stored in a respective native contact application.

* * * * *